United States Patent [19]

Akkapeddi et al.

[11] Patent Number: 5,079,339

[45] Date of Patent: Jan. 7, 1992

[54] COPOLYMER OF DODECANE TEREPHTHALAMIDE

[75] Inventors: Murali K. Akkapeddi, Morris Plains; Jeffrey H. Glans, Somerville, both of N.J.

[73] Assignee: Allied-Signal Inc., Morris Township, Morris County, N.J.

[21] Appl. No.: 566,790

[22] Filed: Aug. 13, 1990

Related U.S. Application Data

[63] Continuation of Ser. No. 388,182, Jul. 31, 1989, abandoned.

[51] Int. Cl.⁵ ..................... C08G 69/14; C08G 69/26
[52] U.S. Cl. ............................ 528/347; 528/28; 528/324; 528/338; 528/339; 528/340; 528/344; 528/345
[58] Field of Search ............... 528/347, 338, 339, 340, 528/324, 344, 345, 28

[56] References Cited

U.S. PATENT DOCUMENTS

| | | | |
|---|---|---|---|
| 3,379,695 | 4/1968 | Wolfes et al. | 528/347 |
| 3,475,387 | 10/1969 | Carter et al. | 528/347 |
| 3,642,710 | 2/1972 | Keen et al. | 260/78 |
| 3,790,423 | 2/1974 | Jones | 156/331 |
| 3,792,083 | 2/1974 | Steitz, Jr. et al. | 260/501.2 |
| 3,833,547 | 9/1974 | Steitz et al. | 260/78 R |
| 3,839,296 | 10/1974 | Campbell | 528/347 |
| 3,843,611 | 10/1974 | Campbell | 260/78 R |
| 3,917,561 | 11/1975 | Chapman et al. | 260/78 |
| 3,939,636 | 2/1976 | Nakayama et al. | 528/347 |
| 4,018,746 | 4/1977 | Brinkmann et al. | 528/347 |
| 4,603,166 | 7/1986 | Poppe et al. | 528/347 |
| 4,898,896 | 2/1990 | Maj et al. | 528/323 |

OTHER PUBLICATIONS

Chemical Abstract, vol. 78, No. 8, 2/26/73, p. 64, Abstract 44934X, Tsuda.
Journal of Polymer Science, vol. VIII, No. 1, pp. 1-19, "The p-Phenylene Linkage in Linear High Polymers; Some Structure-Property Relationships" Owen B. Edgar, Rowland Hill, 1958.
Saotome et al., Polyamides Having Long Methylene Chain Units, J. Pol. Sci. Part A-1, vol. 4, pp. 1463-1473 (1966).

Primary Examiner—Harold D. Anderson
Attorney, Agent, or Firm—Andrew N. Parfomak; Roger H. Criss

[57] ABSTRACT

The present invention is an improved polyamide copolymer having monomer units including repeat units of the formula

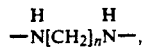

where n is from 10 to 14 and preferably is 12 (1,12-dodecanediamine), units derived from a symmetrical diacid or derivatives of said diacid, preferably a symmetrical aromatic dicarboxylic acid. The copolymer has minor amounts, preferably 3 to 30 and more preferably 5 to 10 mol percent, of units derived from an additional comonomer.

11 Claims, No Drawings

COPOLYMER OF DODECANE TEREPHTHALAMIDE

This application is a continuation of application Ser. No. 388,182 filed July 31, 1990 now abandoned.

BACKGROUND OF THE INVENTION

The present invention is in the field of polyamides, more particularly, the present invention relates to copolymers derived from long chain diamines, a symmetrical diacid or derivative thereof, and at least one specifically selected additional comonomer.

Conventional aliphatic nylons such as polycaprolactam (nylon 6), poly(hexamethylene adipamide) (nylon 6,6) have high melting points and are thermoplastically processable. However, they have undesirably high water absorption characteristics, absorbing from 8 to 12 wt. percent water. Water absorption causes dimensional growth, and plasticization with a significant reduction in stiffness. This makes them unsuitable for various end use applications.

Long chain aliphatic polyamides such as polylaurolactam (nylon 12), and poly(1,12-dodecamethylene dodecanamide) (nylon 12,12) have low moisture-absorbing properties, but have undesirably low melting points (below 180° C.). Symmetrical rigid, aromatic diacids, such as terephthalic acid monomers used with aliphatic diamines having from 6 to 12 carbon atoms result in polyamides having low moisture absorbing characteristics but undesirably high melting points (greater than 300° C.). Such melting points are often above the nylon degradation temperatures so that the polyamide cannot be melt-polymerized or melt-processed.

SUMMARY OF THE INVENTION

The present invention is an improved polyamide copolymer derived from a long chain diamine, preferably $RHN[CH_2]_nNHR$, where n is from 10 to 14, and preferably is 12 (i.e., 1,12-dodecanediamine) and R is preferably H or an alkyl carbonyl group such as

resulting in the monomer repeat unit

and a symmetrical diacid or derivative thereof, preferably

where Ar is an aromatic group, and R' is preferably —OH, alkoxy group such as —OCH₃, or a halogen, resulting in the monomer repeat unit

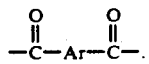

Preferably the diacid is a symmetrical aromatic dicarboxylic acid. The symmetrical aromatic diacid or derivative thereof is preferably selected from the group consisting of terephthalic acid, 2,6-naphthalene dicarboxylic acid, 4,4'-biphenyl dicarboxylic acid and dimethyl terephthalate. The copolymer has minor amounts, preferably 3 to 30 and more preferably 5 to 10 mol percent, of an additional comonomer.

Useful and preferred additional comonomers include units derived from monomers which are difunctional. The functional groups are groups which are reactive with the amine groups of the diamine or the acid groups of the diacid. Preferred functional groups include amine groups, hydroxyl groups and carboxylic acid groups. Specific and preferred comonomers include lactams having up to 9 methylene groups, nonsymmetrical aromatic diacids, and hydroxy terminated polyolefins or polyethers. Depending upon the comonomer, the resulting polyamide copolymer will have high crystallinity and low moisture absorption, or the additional comonomer will contribute a "soft segment" making the polyamide copolymer more flexible.

Additional comonomers which result in the improved crystallinity and low moisture absorption of the polyamide copolymer are preferably present in an amount sufficient to reduce the melting point while at the same time enable the polymer to have high crystallinity and low moisture absorption properties. Preferably, the additional comonomer results in a polyamide copolymer having relatively high crystalline melting points of preferably from 250° C. to 300° C., and more preferably 270° C. to 290° C., high crystallinity, preferably at least 20 percent, and low moisture absorption, preferably below 5 percent, and more preferably below 3 weight percent based on the weight of polyamide copolymer and moisture. The additional comonomer can be preferably present in random or block segments thereby resulting in a random or block copolymer. The major blocks of polyamide are derived from the long chain diamine and the symmetrical diacid. Preferred additional comonomers include diamines and nonsymmetrical diacids. Preferred diamines include 4,9-dioxadodecane-1,12-diamine; 4,11-dioxa-tetradecane-1,14-diamine; caprolactam, and laurolactam. Preferred nonsymmetrical diacids include phthalic acid and isophthalic acid.

Comonomers which result in a polyamide copolymer having a flexible (low glass transition temperature, Tg), hydrophobic structure include block segments of polyolefin polyether and polysiloxane and the like. Preferred segments include telechelic amine terminated polyolefins including polyethylene, poly(ethylene-propylene), polyisobutylene, poly(ethylene-butene), and the like. Preferred polyether, is bisamino alkyl, polytetramethyleneoxide (derived from polytetrahydrafuran), and preferred polysiloxane is poly(dimethyl siloxane); i.e., alpha,-omega-bisaminoalkyl poly(dimethyl siloxane). These comonomers have been found to act as a "soft segment" when used in the form of a block copolymer. The resulting copolymer has a combination of properties including high ductility (tensile-elongation), heat and chemical resistance, and low moisture absorption properties. They are useful for extrusion and molding applications.

DESCRIPTION OF THE PREFERRED EMBODIMENTS

The present invention is a polyamide copolymer comprising units derived from a long chain diamine preferably $RHN[CH_2]_nNHR$, where n is from 10 to 14 and preferably is 12 (i.e., 1,12-dodecanediamine); and R is preferably H or an alkyl carbonyl group such as

resulting in the monomer repeat unit

a symmetrical diacid and derivatives thereof, preferably a symmetrical aromatic diacid and derivatives thereof, preferably

where Ar is an aromatic group, and R' is preferably —OH, alkoxy group such as —OCH₃, or a halogen resulting in the monomer repeat unit

and an additional comonomer. Useful Ar's include

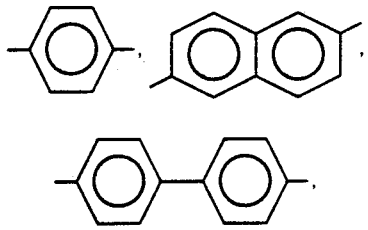

and the like. The aromatic groups can contain substituents which do not adversely affect the properties of the polyamide copolymer. The symmetrical aromatic diacid is preferably selected from the group consisting of terephthalic acid, 2,6-naphthalene dicarboxylic acid, 4,4'-biphenyl dicarboxylic acid and dimethyl terephthalate. The preferred polyamide copolymer has units derived from 1,12-dodecanediamine copolymerized with a terephthalic acid and the additional comonomer. The copolymer comprises from 35 to 48.5 mol, and preferably 40 to 45 mol percent of units derived from the long chain diamine preferably dodecanediamine, from 35 to 48.5, and preferably from 40 to 45 mol percent of units derived from terephthalic acid or derivatives thereof. Additionally, the copolymer comprises at least 3, and preferably from 3 to 30, and more preferably from 5 to 10 mol percent of units derived from the additional comonomer.

A preferred embodiment has units derived from at least one additional comonomer which results in a copolymer having a relatively high melting point, high crystallinity, and has low moisture absorption characteristics. The preferred polyamide copolymer has a melting point below a copolymer derived from a corresponding long chain diamine and symmetrical diacid or derivative thereof (i.e., dodecanediamine and terephthalic acid) of the same molecular weight. The melting point of the preferred polyamide copolymer is preferably in the range of from 250° C. to 300° C., and more preferably 270° C. to 290° C. The polyamide copolymer is highly crystalline as measured by X-ray diffraction. The polyamide copolymer is preferably at least 20 percent, and more preferably at least 30 percent. The upper range of crystallinity is typically 40 percent mol and preferably 50 percent crystalline. Additionally, the polyamide copolymer has low moisture absorption characteristics as measured according to ASTM D 570-81. Preferably the polyamide copolymer absorbs less than 5 percent by weight, and preferably less than 3 percent by weight of moisture based on the weight of the polyamide copolymer and moisture.

Preferred additional comonomers which lead to co-crystallizable segments, or at least do not significantly reduce crystallinity are diamines such as 4,9-dioxa-1,12-diaminododecane; 4, 11-dioxa-tetradecane-1,14-diamine; non-symmetrical diacids including isophthalic acid; lactams having up to 8 methylene groups, preferably laurolactam and caprolactam. Copolyamides made using these additional comonomers have been found to have crystalline melting points of from 270°-285° C., a low water absorption character of 1.7-3 percent by weight when measured according to ASTM D 570-81, good melt processability, at or below 300° C., and satisfactory mechanical properties including strength and toughness. The copolyamides have been found to have excellent chemical resistance, particularly to aqueous zinc chloride solutions.

Additionally, the polyamide copolymers have been found to be dimensionally stable when exposed to heat and moisture, and have chemical resistance to gasoline and alcohol as well as a variety of other organic materials. This makes the copolymers of the present invention useful for a variety of high-performance engineering resin applications, such as automotive under-the-hood parts, fuel lines, and fuel component parts.

An alternate embodiment of the polyamide copolymer can include comonomer units to improve flexibility of the copolymer. Comonomers having a flexible hydrophobic structure resulting in a soft segment include the olefins present as polyolefin segments such as polyethylene, poly(ethylene-propylene), polyisobutylene, poly(ethylenebutene), and the like. A preferred ether is a polyether such as bis[aminopropyl]polytetrahydrafuran (derived from polytetramethyleneoxide); alpha,omega-bis(aminoalkyl)poly(tetramethyleneoxide); alpha,omega-diamino polyolefins; i.e., telechelic, amino terminated polyethylene; and polysiloxanes such as poly(dimethyl siloxane); i.e., alpha,omega-bisaminoalkyl poly(dimethyl siloxane). The molecular weight of the soft segments preferably range from 200 to 6,000 and more preferably from 750 to 2100. Polyethylene oxide is not preferred because of the high water absorption.

The additional comonomer preferably is derived from comonomers resulting in units having the formula

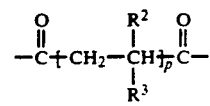

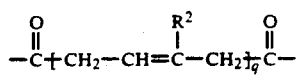

-continued

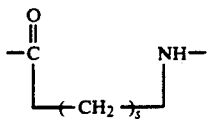

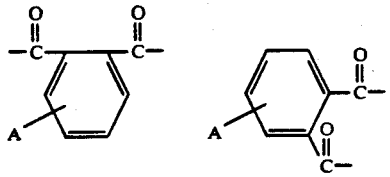

wherein
$R^2$ is selected from —H, —CH$_3$, —C$_2$H$_5$, —Cl, —CH═CH$_2$, and mixtures thereof,
$R^3$ is selected from —H, —CH$_3$, —C$_2$H$_5$, —CH—CH$_2$, and mixtures thereof,
A is selected from H, a halogen, and a hydrocarbon having from 1 to 4 carbon atoms,
p is from 5 to 80,
q is from 10 to 80,
r is from 1 to 30, preferably 5 to 30,
s is from 4 to 9,
x is from 4 to 6, and
x' is from 2 to 6.

The copolymer of the present invention can be made by conventional methods to copolymerize polyamides. Particularly preferred are melt polymerization techniques in which the monomers are melted together under an inert atmosphere. The melt polymerization preferably is conducted at from 275°–320° C., and more preferably from 295°–320° C.

In addition to the three principle monomeric constituents, which together produce the copolymer of this invention, other polymerizable monomers can also be used to prepare copolymers. Included in these are vinyl compounds and other monomers which could be polymerized directly into a linear polymer chain. The quantity of such additional monomers can vary and can be up to 30 mol percent of the total number of polymerizable constituents but preferably is limited to quantities of less than 15 mol percent, more preferably less than 5 mol percent.

Several Examples are set forth below to illustrate the nature of the invention and the manner of carrying it out. However, the invention should not be considered as being limited to the details thereof. All parts are by weight unless otherwise indicated.

EXAMPLES

The following are Examples of copolymerizations of 1,2-dodecanediamine, terephthalic acid and the indicated additional comonomer. The copolymerizations were performed in the indicated equipment with mechanical stirring under a sweep of an inert gas (either nitrogen or argon). In each case the polymerizations were run until a significant increase in viscosity was noted and then the sample was allowed to cool. The resulting solid was broken up and ground in a Wiley ® mill to produce a powder. Melting points were determined by a differential scanning calorimetry (DSC) on a Perkin-Elmer DSC 2 calorimeter. Reduced viscosities were determined by samples dissolved in m-cresol or concentrated sulfuric acid.

Samples to be tested in accordance with ASTM tests were injection molded using an Arburg ® injection molding machine a 320° C. and 450 psi conditions. Tensile tests were performed on molded samples according to ASTM D-638 procedures.

Water absorption measurements were performed on thin compression-molded films according to ASTM-D-570-81. Films were compression-molded at 300° C. for 1 minute at 10 to 20 tons of pressure. The films were 0.1 mm thick. The films were submerged in water and their change in weight monitored until equilibrium.

Zinc chloride resistance was measured by immersing a bent ⅛ inch test bar in a 50 wt. percent solution of zinc chloride. The test bars were molded as described above, 7 inches long by ⅜ inch at the tabs, ¼ inch in the neck region and ⅛ inch thick (ASTM-D-638 test bars). The bars were bent 180 degrees. The appearance of the bar and its structural integrity were noted with time.

COMPARATIVE EXAMPLE 1

A 0.5 L stainless steel resin kettle (wide mouth kettle) was charged with 24.4 g (122 mmol) of 1,12-dodecanediamine, 20.3 g (122 mmol) of terephthalic acid, and 40 ml of water. The reaction mixture was slowly heated to 300° C. The material was intractable and never melted out properly.

EXAMPLE 1

A 500 ml stainless steel resin kettle with a mechanical stirrer was charged with 51.1 g (0.255 mol) of 1,12-dodecanediamine, 5.79 g (0.28 mol) of 4,9-dioxadodecane-1,12-diamine, 44.9 (0.270 mol) of terephthalic acid, and 50 ml of water. The polymerization mixture was slowly heated to 320° C. to give a clear viscous melt. The polymer was allowed to cool and broken up. The resulting resin was dried overnight at 110° C. under vacuum.

EXAMPLE 2

A three liter glass resin kettle was charged with 540.9 (2.70 mol) of 1.12-dodecanediamine, 61.3 g (0.30 mol) of 4,9-dioxadodecane-1,12-diamine, 473.5 g (2.85 mol) of terephthalic acid and 400 ml of water. The mixture was slowly heated to 300° C. The resulting viscous melt was cooled to room temperature, broken up, and dried at 100° C. under vacuum overnight.

EXAMPLE 3

A three liter glass resin kettle was charged with 517.1 g (2.58 mol) of 1,12-dodecanediamine, 226.9 g (0.30 mol) of bisaminopropoxypolytetrahydrofuran 750, 456.0 g (2.74 mol) of terephthalic acid, and 400 ml of water. The mixture was slowly heated to 293° C. to give a viscous melt. The melt was allowed to cool to room temperature, ground up, and dried overnight at 100° C. under vacuum. This sample was unaffected by immersion in a zinc chloride solution for over one month.

EXAMPLE 4

A three liter stainless steel resin flask was charged with 336 g (1.68 mol) of 1,12-dodecanediamine, 84 g (0.112 mol) of bisaminopropoxypolytetrahydrofuran 750, 282.8 g (1.70 mol of terephthalic acid), and 250 ml of water. The mixture was slowly heated to 300° C. to give a viscous melt. The reaction mass was allowed to cool to room temperature, ground up, and dried overnight at 100° C. vacuum.

EXAMPLE 5

A one liter stainless steel resin kettle fitted with a mechanical stirrer and an argon sweep was charged with 286.1 g (1.43 mol) of 1,12-dodecanediamine, 203.6 g (1.23 mol) of terephthalic acid, 22.6 g (0.14 mol) of isophthalic acid, and 400 ml of water. The kettle was slowly heated to 300° C. under a sweep of argon. The resulting polymer was broken up, and dried (110° C., vacuum) overnight.

EXAMPLE 6

A 0.5 L stainless steel kettle was charged with 6.8 g (60.0 mmol) of caprolactam, 113.6 g (567 mmol) of 1,12-dodecanediamine, 89.7 g (540 mmol) of terephthalic acid and 200 ml of water. The reaction mixture was slowly heated to 300° C. which resulted in a viscous melt. The resulting material was allowed to cool, broken up, and dried overnight at 110° C. under vacuum.

Samples were tested for physical properties and results are summarized in Table 1 below. R.V. is relative viscosity, Tm is crystalline melt temperature.

TABLE 1

| Ex. | R.V. | Tm °C. | Modulus kpsi | Strength kpsi | Elongation % | Water Absorption % |
|---|---|---|---|---|---|---|
| 1 | 1.61* | 274, 283 | 371 | 7.9 | 2.3 | 3.3 |
| 2 | 0.36 | 280, 293 | 303 | 9.8 | 27.0 | — |
| 3 | 0.31 | 274, 288 | 257 | 7.9 | 150.0 | 3.5 |
| 4 | 0.49 | 284, 293 | 276 | 10.6 | 117.0 | — |
| 5 | 1.48* | 284 — | 367 | 12.0 | 11.3 | 1.7 |
| 6 | — | 289 — | — | — | — | 2.0 |

*measured in m-cresol

While exemplary embodiments of the invention have been described, the true scope of the invention is to be determined by the following claims.

What is claimed is:

1. A polyamide copolymer comprising diamine monomer repeat units of the formula

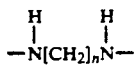

where n is 10 or 12 and repeat units of the formula

derived from a symmetrical diacid or derivative of said diacid and where Ar is an aromatic group, and a sufficient amount of units of at least one additional comonomer selected from the group consisting of:

4,11-dioxa-tetradecane-1,14-diamine,
4,9-dioxa-1,12-diaminododecane,
lactams having up to 9 methylene groups in the lactam ring,
telechelic amine terminated polyolefins,
bis(aminoalkyl)polytetramethylene oxide, and,
bis(aminoalkyl)poly(dimethylsiloxane), whereby the copolymer exhibits, a water absorption according to ASTM D 570-81 of less than or equal to 5 percent by weight of the copolymer, and the copolymer has a crystalline melting point in the range of 250-300 deg.C.

2. The copolymer according to claim 1 wherein the symmetrical diacid or derivative thereof is at least one selected from the group consisting of: terephthalic acid, 2,6-naphthalene dicarboxylic acid, 4,4'-biphenyl dicarboxylic acid, and dimethyl terephthalate.

3. The copolymer according to claim 2 wherein the symmetrical diacid or derivative thereof is terephthalic acid.

4. The copolymer according to claim 1 wherein the diamine monomer repeat units are derived from 1,12-dodecanediamine.

5. The copolymer according to claim 1 wherein the comonomer has block copolymer units which block comonomer units having a molecular weight in the range of 200-6000.

6. A polyamide copolymer comprising units derived from dodecanediamine, and terephthalic acid or a derivative of terephthalic acid, and a sufficient amount of at least one additional comonomer selected from the group consisting of:

4,11-dioxa-tetradecane-1,14-diamine,
4,9-dioxa-1,12-diaminododecane,
lactams having up to 9 methylene groups in the lactam ring,
telechelic amine terminated polyolefins,
bis(aminoalkyl)polytetramethylene oxide, and,
bis(aminoalkyl)poly(dimethylsiloxane)

whereby the copolymer exhibits a water absorption according to ASTM D 570-81 of less than or equal to 5 percent by weight of the copolymer, and the copolymer has a crystalline melting point in the range of 250-300 deg.C.

7. The copolymer according to claim 6 wherein the additional comonomer comprises up to 30 percent by weight of the copolymer.

8. The copolymer according to claim 6 which exhibits crystallization of at least 20 percent measured according to x-ray diffraction.

9. The copolymer according to claim 6 which exhibits a crystalline melting point in the range of 270-290 deg.C.

10. The copolymer according to claim 6 wherein the telechelic amine terminated polyolefins are at least one selected from the group consisting of: polyethylene, poly(ethylenepropylene), and polyisobutylene.

11. The copolymer according to claim 6 wherein the telechelic amine terminated polyolefins are at least one selected from the group consisting of: polyethylene, poly(ethylenepropylene), and polyisobutylene.

* * * * *

UNITED STATES PATENT AND TRADEMARK OFFICE
CERTIFICATE OF CORRECTION

PATENT NO. : 5,079,339

DATED : January 7, 1992

INVENTOR(S) : Murali K. Akkapeddi and Jeffrey H. Glans

It is certified that error appears in the above-indentified patent and that said Letters Patent is hereby corrected as shown below:

Column 8, line 24, "copolymer" should read --comonomer--.
Column 8, line 25, "having" should read --have--.

Signed and Sealed this

Seventh Day of September, 1993

Attest:

BRUCE LEHMAN

Attesting Officer    Commissioner of Patents and Trademarks